(No Model.)

G. W. HADLEY.
MILLING MACHINE.

No. 535,245. Patented Mar. 5, 1895.

Attest:
Cele Burdine.
C. B. Bull.

Inventor.
George W. Hadley,
By Dodge & Sons,
Atty's.

UNITED STATES PATENT OFFICE.

GEORGE WASHINGTON HADLEY, OF CHICOPEE FALLS, MASSACHUSETTS, ASSIGNOR OF ONE-HALF TO THOMAS C. PAGE, OF SAME PLACE.

MILLING-MACHINE.

SPECIFICATION forming part of Letters Patent No. 535,245, dated March 5, 1895.

Application filed October 25, 1894. Serial No. 526,947. (No model.)

*To all whom it may concern:*

Be it known that I, GEORGE WASHINGTON HADLEY, a citizen of the United States, residing at Chicopee Falls, in the county of Hampden and State of Massachusetts, have invented certain new and useful Improvements in Milling-Machines, of which the following is a specification.

My invention relates to milling machines, and has reference more particularly to a novel means for preventing the work from being brought suddenly and with force against the milling tool or cutter, thereby avoiding damage or injury to the latter.

Figure 1:
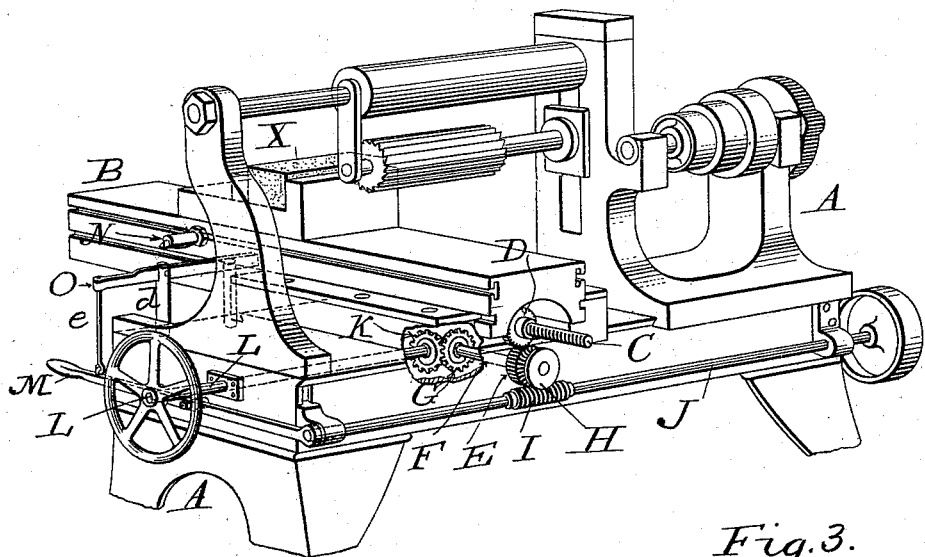
Figure 3:
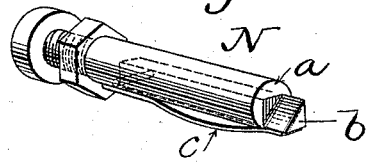
Figure 2:
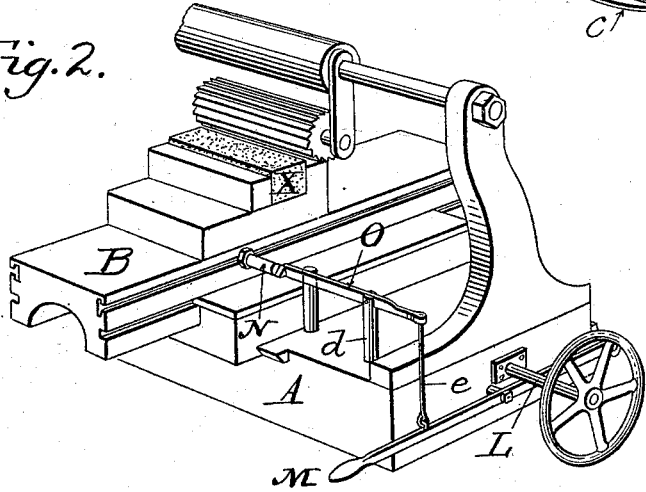

In the drawings,—Figure 1 is a perspective view of so much of a milling machine as is necessary to illustrate my invention; Fig. 2, a perspective view looking from the front; and Fig. 3, a perspective view of the stop pin.

A indicates the main frame of the machine on which is mounted the slide or carriage B. The latter is adapted to be moved back and forth, as usual, by means of the screw C which receives rotation from the spur gear D, which latter meshes with the gear E on the shaft F; the said shaft being journaled in the main frame. Upon this shaft F there is also a bevel gear G and a worm wheel H, the latter engaging a worm I on the feed shaft J, while the bevel gear engages a similar gear K on the inner end of the hand-feed shaft L. Secured to the shaft J is a lever M by means of which the shaft may be moved so as to throw the worm I into and out of gear with the worm wheel H and thereby bring the power feed into and out of action. When the power feed is thrown out of action, the carriage or slide may be moved backward and forward by hand by means of shaft L, gears G K, shaft F, gears E D, and screw C.

So far the construction and operation is substantially the same as that found in the Pratt and Whitney and other standard milling machines. Where this mechanism alone is employed, the operators are frequently careless and run their work up against the cutters by hand before they notice it, with the result that valuable and expensive cutters are often damaged and rendered useless by this sudden contact with the work. An attempt has been made to overcome this difficulty by moving the carriage upward up to within an inch or two of the work, and then throwing the power-feed into action, but as the power feed mechanism acts slowly, this consumes too much time. To avoid the difficulty and to enable the work to be fed up to within, say, one one-hundreth of an inch of the cutter, and then stopped positively, I adopt the construction which will now be described. Adjustably secured to the side of the carriage or slide is a stop pin N, which comprises a forked stem or body *a;* and a contact arm *b* beveled on the upper front edge or side, at the outer end; the said arm being pivoted at its inner end in the forked body and held normally in line with the latter (beyond which it projects) by means of the spring *c.* This stop pin is designed to engage one end of a lever O pivoted to a post or stud *d* on the main frame, and connected by means of a link *e* with the shifting lever M. When the lever M is raised to throw the power feed out, the inner end of lever O will be brought into position to be struck by the stop pin N when the carriage is fed up by hand; but when the lever M is lowered and the power feed is thrown in, the inner end of lever O will be raised out of the path of the stop pin, it being understood that when the stop pin strikes the lever O, further movement of the carriage is prevented.

The operation is as follows: The work, designated by X, is secured to the carriage or slide B, and the stop pin N is secured to the slide at such point as will insure the engagement of the pin with the arm or lever O and the stoppage of the slide at the desired distance from the cutter, this adjustment of the stop pin depending upon the character of the work, or of the cutter, or both. The shifting lever M is now raised to throw the power-feed-mechanism out of action, this movement of the shifting lever throwing the inner end of the arm or lever O down into the path of the stop pin. The attendant now carries the slide and work forward rapidly by the hand-feed-mechanism, until the stop pin N strikes against the end of the arm or lever O, thereby limiting the forward travel of the slide or carriage and holding the work at a distance, say, one one-hundredth of an inch from the cutter. The attendant now depresses the shifting lever M, and in doing this throws the power-feed mechanism into action, and simultaneously carries the lever or arm O up out of the path of the stop pin N, thereby releasing the carriage and its work and allowing the latter to be carried forward to the cutter by the power-feed. After the cut has been made, the shifting lever M is again raised to throw the power-feed mechanism out of action and to stop further forward travel of the carriage, but this movement, as before stated, brings the lever or arm O down into the path of the stop pin. The arm or lever O will not, however, interfere with or prevent the retraction of the slide or carriage, because, when the latter moves backward, the beveled end of the arm $b$ of the stop pin striking against the end of the arm or lever O is depressed and rides under the latter, returning to its normal position as soon as it passes the lever.

The power-feed and the hand-feed mechanisms herein shown and described are merely illustrative, and may be varied as desired, the construction to be adopted in practice depending upon the particular make of machine to which my invention is to be applied.

I do not restrict myself to the precise construction shown, as my invention comprehends broadly a mechanism for throwing the feed and a stop device into and out of action, and with or by means of a single lever, or whatever device may be used for the purpose.

The power-feed may be so constructed and arranged as that it shall be thrown into action by the stop pin when the work reaches the predetermined limit of travel toward the cutter,—the work being temporarily arrested in its travel and prevented from striking the cutter suddenly and with force. Of course where such an automatic arrangement is employed, the hand lever would be omitted.

I am well aware that planers and lathes have been provided with mechanisms by means of which when the carriage reaches the end of its travel, and after the proper cut has been made, the feed mechanism is automatically thrown out of action. Such an idea is not within the scope of my invention which is directed to the controlling of the movement, or travel, of the carriage prior to its reaching the cutter, whereby the milling tool or cutter is prevented from being injured by having the work brought against it suddenly and with force.

Having thus described my invention, what I claim is—

1. In combination with a work-holding slide or carriage; a feed mechanism therefor; a stop mechanism limiting the approach of the work to the cutter; and means for throwing the feed mechanism into action and the stop mechanism out of action; whereby the work may be brought close to the cutter, arrested, and then fed forward again, substantially as shown and described.

2. In combination with a work-holding slide or carriage; a feed mechanism therefor; a stop mechanism for limiting the approach of the work to the cutter; and means for throwing the feed out of action and the stop mechanism into action; whereby the work is caused to move forward to a predetermined distance from the cutter, and arrested and held against further forward movement until the feed mechanism is again thrown into action, substantially as described.

3. In combination with the work-holding slide or carriage and its hand-feed and power-feed mechanisms; a stop mechanism to limit the approach of the work to the cutter; and means for controlling the stop and power-feed mechanisms.

4. In combination with the work-holding slide or carriage and a power feed mechanism therefor; a stop mechanism limiting the approach of the work to the cutter; and means for simultaneously throwing the feed mechanism out of action and the stop mechanism into action, or vice versa; whereby the work is caused to move toward the cutter, is arrested, and then released to continue its forward movement, substantially as described.

5. In combination with the work-holding slide or carriage; a stop to arrest the slide prior to the work reaching the cutter; and a feed mechanism combined with the stop mechanism, whereby the work is moved toward the cutter, arrested, and then released and moved forward to make the cut, substantially as described.

6. In combination with a work-holding slide or carriage, and its power-feed mechanism; the stop pin N secured to the carriage; a shifting lever M; and a stop arm or lever O connected with the shifting lever.

In witness whereof I hereunto set my hand in the presence of two witnesses.

GEORGE WASHINGTON HADLEY.

Witnesses:
GEORGE M. VAIL,
G. A. ORDWAY.